United States Patent
MacInnis et al.

(10) Patent No.: US 7,791,673 B2
(45) Date of Patent: *Sep. 7, 2010

(54) METHOD AND SYSTEM FOR POLARITY CHANGE COUNT

(75) Inventors: Alexander MacInnis, Lake Oswego, OR (US); Chenhui Feng, Sunnyvale, CA (US)

(73) Assignee: Broadcom Corporation

( * ) Notice: Subject to any disclaimer, the term of this patent is extended or adjusted under 35 U.S.C. 154(b) by 1149 days.

This patent is subject to a terminal disclaimer.

(21) Appl. No.: 11/254,450

(22) Filed: Oct. 20, 2005

(65) Prior Publication Data

US 2007/0091214 A1    Apr. 26, 2007

(51) Int. Cl.
*H04N 7/01* (2006.01)
(52) U.S. Cl. ...................... 348/448; 348/452
(58) Field of Classification Search ........... 348/448, 348/449, 451, 452, 607, 625, 622, 628, 700, 348/701; *H04N 7/01, 11/20, 5/21*
See application file for complete search history.

(56) References Cited

U.S. PATENT DOCUMENTS

| | | | |
|---|---|---|---|
| 6,262,773 B1 * | 7/2001 | Westerman | 348/448 |
| 6,459,455 B1 * | 10/2002 | Jiang et al. | 348/452 |
| 6,567,468 B1 * | 5/2003 | Kato et al. | 375/240.12 |
| 7,170,562 B2 * | 1/2007 | Yoo et al. | 348/452 |
| 7,193,655 B2 * | 3/2007 | Nicolas | 348/448 |
| 2002/0105596 A1 | 8/2002 | Selby | |

* cited by examiner

*Primary Examiner*—Sherrie Hsia
(74) *Attorney, Agent, or Firm*—McAndrews, Held & Malloy, Ltd.

(57) ABSTRACT

A method for comparing pixels may comprise determining at least one polarity difference for at least one pair of neighboring pixels selected from a plurality of adjacent pixels, which are from different fields. A number of subsequent polarity changes may be calculated for the pair of neighboring pixels based on the determined polarity of difference. The adjacent pixels may be selected from a plurality of woven fields. A portion of the selected adjacent pixels may include pixels in neighboring fields. A portion of the selected adjacent pixels may include vertically adjacent pixels, horizontally adjacent pixels, and/or diagonally adjacent pixels. At least one pixel in the plurality of adjacent pixels includes a corresponding horizontally, vertically or diagonally located adjacent pixel in a different field.

30 Claims, 9 Drawing Sheets

METHOD AND SYSTEM FOR POLARITY CHANGE COUNT

RELATED APPLICATIONS

This application is related to the following applications, each of which is hereby incorporated herein by reference in its entirety for all purposes:

U.S. patent application Ser. No. 11/254,262 filed Oct. 20, 2005; and

U.S. patent application Ser. No. 11/254,455 filed Oct. 20, 2005.

FIELD OF THE INVENTION

Certain embodiments of the invention relate to processing of video. More specifically, certain embodiments of the invention relate to a method and system for generating a polarity change count.

BACKGROUND OF THE INVENTION

During interlacing, pictures that form a video may be captured at two distinct time intervals. These pictures, which form the video, comprise a plurality of ordered lines. During one of the time intervals, video content for even-numbered lines may be captured, while at a subsequent time interval, video content for odd-numbered lines may be captured. The even-numbered lines may be collectively referred to as a top field, while the odd-numbered lines may be collectively referred to as a bottom field. On an interlaced display, the even-numbered lines may be presented for display on the even-numbered lines of a display during one time interval, while the odd-numbered lines may be presented for display on the odd-numbered lines of the display during a subsequent time interval.

With progressive displays, however, all of the lines of the display are displayed at one time interval. During de-interlacing of interlaced video, a deinterlacing process may generate pictures for display during a single time interval. Deinterlacing by combining content from adjacent fields, which is known as weaving, may be suitable for regions of a picture that are characterized by less object motion or lighting changes, known as inter-field motion. Displaying both the top field and bottom field at the same time interval may be problematic in cases where the video content comprises significant motion or significant lighting changes. Objects that are in motion are at one position when the top field is captured and another position when the bottom field is captured. If the top field and the bottom field are displayed together, a comb-like, or jagged edge affect may appear with the object. This is referred to as a weave artifact.

Alternatively, deinterlacers may generate a picture for progressive display by interpolating missing lines in a field from adjacent and surrounding lines. This is known as spatial interpolation, or "bobbing". While spatial interpolation avoids weave artifacts in regions with inter-field motion, spatial interpolation loses vertical detail and may result in a blurry picture. Accordingly, some deinterlacers measure inter-field motion. In regions of a picture that are characterized by high inter-field motion, spatial interpolation is chosen, while in regions of the picture that are characterized by little or no inter-field motion, weaving is chosen. In some cases, high vertical detail may be mistaken for inter-field motion. Additionally, the presence of noise may also be mistaken for inter-field motion. In such cases, although a region of picture is characterized by low inter-field motion, spatial interpolation may be chosen. In this regard, methods for processing video may include comparing pixel characteristics.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for generating a polarity change count, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a polarity change count (PCC). A plurality of pixels from different fields may be compared by calculating a plurality of differences between amplitudes of adjacent pixels and determining polarities of the differences. Amplitudes of adjacent pixels may be measured by measuring amplitude of pixel brightness, or luminance, and/or amplitude of pixel chrominance. If a difference in amplitudes of adjacent pixels from different fields is negative, the difference polarity may be assigned a value of, for example, −1. Similarly, if a difference in amplitudes of adjacent pixels from different fields is positive, the difference polarity may be assigned a value of, for example, 1. Any other arbitrary values such as −2 and +2, or −5 and +5, for example, may be utilized without limiting the scope of the invention.

A difference polarity may be calculated for at least one pair of neighboring pixels selected from a plurality of adjacent pixels, which are from different fields. A polarity change count may be determined as a number of subsequent polarity changes of difference polarities for the pair of neighboring pixels from different fields based on the determined difference polarity, −1 or 1, for example. The adjacent pixels may be selected from a plurality of woven fields. A portion of the selected adjacent pixels may comprise pixels from neighboring fields. A portion of the selected adjacent pixels may comprise vertically adjacent pixels, horizontally adjacent pixels, and/or diagonally adjacent pixels.

In accordance with an embodiment of the invention, a current pixel may be selected from a set of adjacent pixels. A difference polarity may be determined for a pair of neighboring pixels from different fields, which includes the selected current pixel, and a corresponding vertically adjacent pixel or a corresponding diagonally adjacent pixel. A difference polarity may also be determined for a pair of neighboring pixels from the same field, which includes the selected current pixel and a corresponding horizontally adjacent pixel. In this regard, a polarity change count may be utilized to detect, for example, bad weave artifacts in two adjacent interlaced video fields that may be woven together.

Figure 1A:
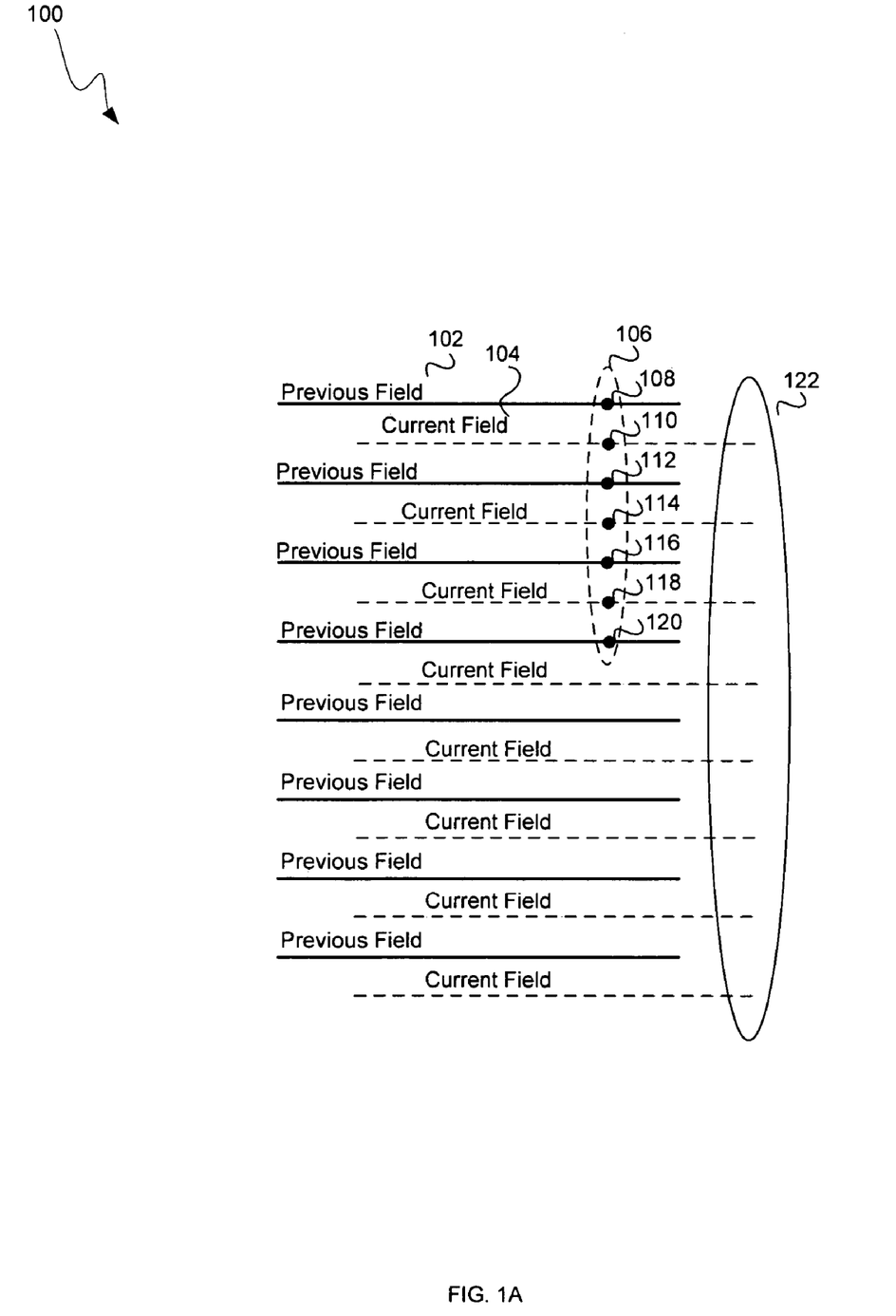
FIG. 1A is a diagram illustrating a selection of pixel samples from different fields, in accordance with an embodiment of the invention.

FIG. 1A is a diagram 100 illustrating a selection of pixel samples from different fields, in accordance with an embodiment of the invention. Referring to FIG. 1A, there is illustrated a plurality of adjacent video lines from different video fields, such as, for example, a current field 104 and a previous field 102. The current field 104 and the previous field 102 may be weaved together resulting in weave artifacts, such as artifacts 122. The weave artifacts 122 may for example result from motion with a horizontal component of vertical or near vertical edges of a video field. A plurality of pixels 108, ..., 120 may be selected from adjacent video lines for comparison and calculation of a polarity change count, for example.

Weaving the two fields 102 and 104 together may produce a comb effect on both the left and right edges of the object, such as artifacts 122. Weaving the two fields 102 and 104 together may result in high vertical frequency spurious details in a portion of the image. The presence of such weave artifacts may indicate the combination of inter-field content motion and content detail. The spurious details may alternate in value every line and have a vertical frequency of 1.0 pi, where pi is the Nyquist frequency of the frame. The highest vertical frequency on an interlaced display that may be perceived as detail, rather than blinking or flutter, may be determined by the Kell factor. For example, for 60 fields/second, the Kell factor is generally considered to be between 0.6 and 0.7. A Kell factor between 0.6 and 0.7 may indicate that the highest vertical frequency that looks like detail is not more than 0.7 pi.

The degree of bad weave artifacts that would be produced at or near each output pixel if a given combination of fields were woven together may be estimated utilizing polarity change count. In this regard pixel comparisons may be made and a polarity change count calculated for the selection of pixel samples. The bad weave artifacts, such as artifacts 122, may be equivalent to the spurious details that may result when two adjacent fields 102 and 104 are combined into one frame. In one aspect of the invention, a plurality of adjacent pixels 106 may be selected from different fields for comparison from adjacent video lines from the weaved previous field 102 and current field 104. For example, the plurality of pixels 106 may comprise a current pixel 114 and pixels 110 and 118 from the current field 104, as well as pixels 108, 112, 116, and 120 from the previous field 120.

In this regard, a difference polarity may be calculated for each adjacent pair of pixels selected from the plurality of pixels 106. A polarity change count (PCC) may then be calculated by counting the number of reversals of the difference polarities between successive lines within the column of pixel samples comprising adjacent pixels 108, ..., 120. The PCC may be adapted to function as a sensitive and reasonably accurate frequency detector that may detect the presence of 1.0 pi signals within the column of samples, for example, seven pixel samples. In this regard, PCC may be utilized to detect weave artifacts and to determine whether to deinterlace video fields utilizing weaving or spatial interpolation, for example.

U.S. patent application Ser. No. 11/254,262 filed Oct. 20, 2005 discloses a method and system for deinterlacing utilizing a polarity change count and is hereby incorporated herein by reference in its entirety.

Figure 1B:
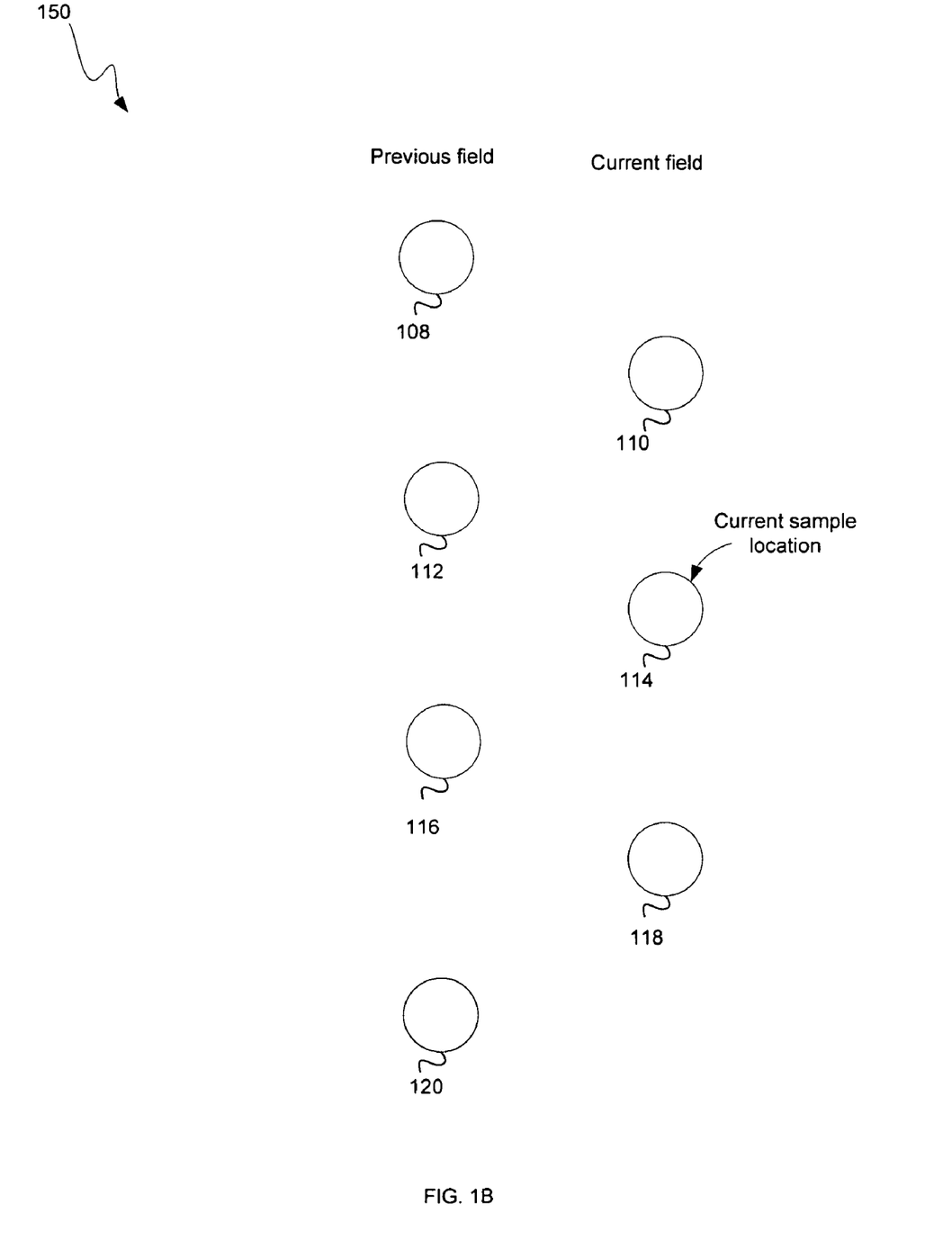
FIG. 1B is a diagram illustrating the selection of pixel samples of FIG. 1A, for example, with pixel allocations in a current and previous fields, in accordance with an embodiment of the invention.

FIG. 1B is a diagram 150 illustrating the selection of pixel samples of FIG. 1A, for example, with pixel allocations in a current and previous fields, in accordance with an embodiment of the invention. Referring to FIG. 1B, pixel samples 108, ..., 120 may comprise pixels from two adjacent weaved fields, such as fields 102 and 104 in FIG. 1A. After weaving, fields 102 and 104 may form a video frame comprising vertically adjacent pixels 108, ..., 120 selected from different fields. For example, a current pixel sample 114 may be selected from the current field 104. Pixel samples 112 and 116 may be selected from the previous field 102 so that pixel samples 112 and 116 may be located immediately above and below, respectively, to the current pixel sample 114. Pixel samples 110 and 118 may be selected from the current field 104 so that pixel sample 110 may be located above pixel sample 112, and pixel sample 118 may be located below pixel sample 116. Pixel samples 108 and 120 may be selected from the previous field 102 so that pixel sample 108 may be located above pixel sample 110, and pixel sample 120 may be located below pixel sample 118.

In an exemplary aspect of the invention, a difference polarity may be calculated for adjacent pairs of pixels 108-110, 110-112, 112-114, 114-116, 116-118, and 118-120 from different fields. A polarity change count (PCC) may then be calculated by counting the number of reversals of the difference polarities between successive lines within the column of pixel samples comprising adjacent pixels 108, ..., 120. In this regard, the PCC method may function as a sensitive and reasonably accurate frequency detector that may detect the presence of 1.0 pi signals within the column of samples comprising pixels 108, ..., 120. Accordingly, PCC may then be utilized to detect weave artifacts within the video frame comprising weaved adjacent fields 102 and 104, and to determine whether to deinterlace video fields 102 and 104 utilizing weaving, spatial interpolation, or a combination of these, for example.

Figure 2:
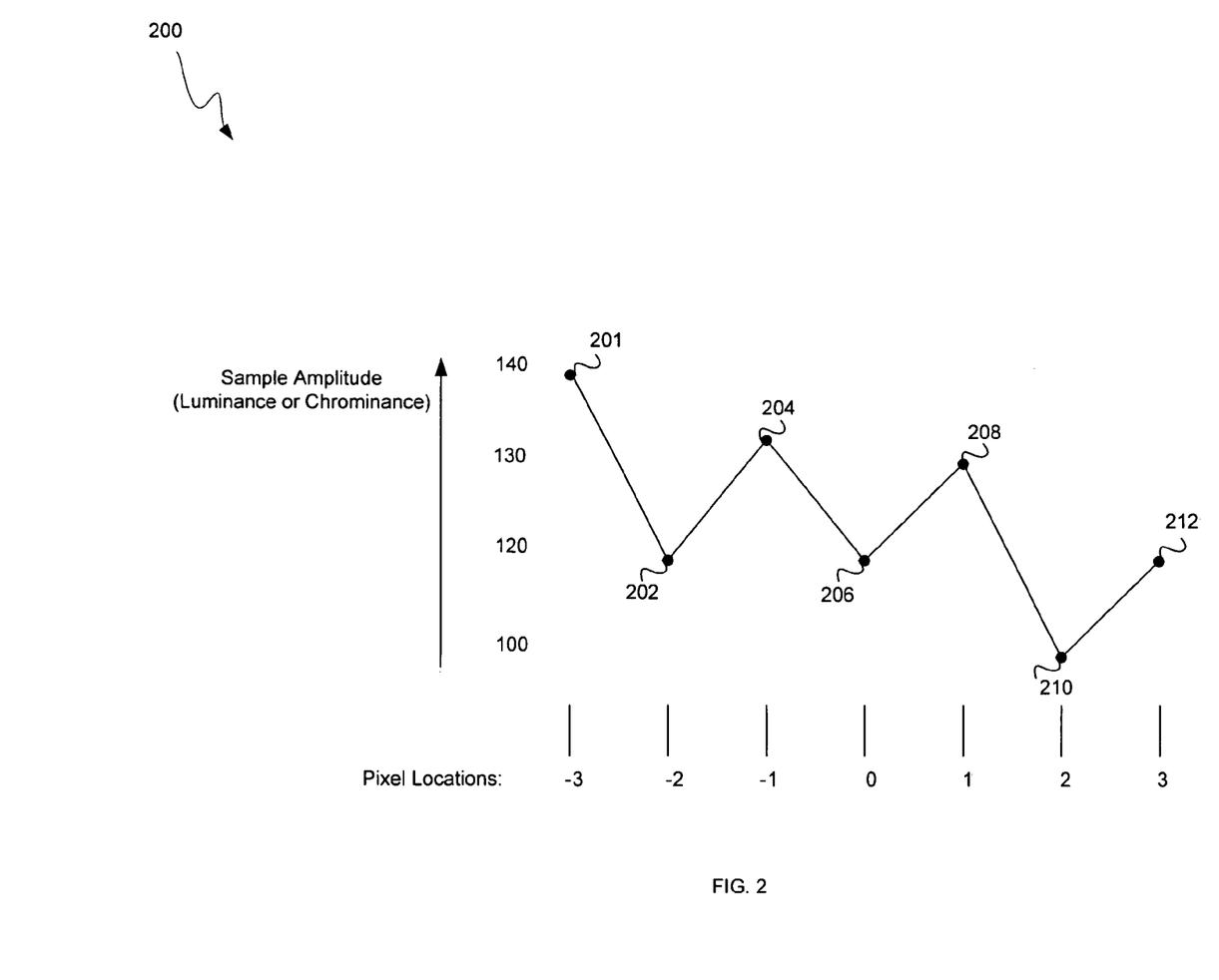
FIG. 2 is a diagram illustrating a plurality of samples for polarity change count (PCC) measurement, in accordance with an embodiment of the invention.

FIG. 2 is a diagram illustrating a plurality of samples for polarity change count (PCC) measurement, in accordance with an embodiment of the invention. Referring to FIG. 2, there is shown a graph 200 illustrating PCC measurement for a plurality of adjacent pixel samples 201, ..., 212, which are selected from different fields. For example, pixel samples 201, 204, 208 and 212 may be selected from a previous field, and pixel samples 202, 206, and 210 may be selected from a corresponding current video field. The sample pixel locations corresponding to pixels 201, ..., 212 may be −3, ..., 3 along the vertical axis, with location 0 being the location of the current sample pixel 206. The amplitude for the pixel samples 201, . . . , 212 may range from 100 to 140, for example, as illustrated along the vertical axis in FIG. 2. In one aspect of the invention, the pixel sample amplitude may comprise luminance, or brightness, amplitude of the sample pixels. In another aspect of the invention, the pixel sample amplitude may comprise chrominance amplitude of the sample pixels, or a combination of luminance and chrominance.

A polarity change count (PCC) for pixel samples 201, . . . , 212 may be calculated by counting the number of reversals in the difference polarities between successive lines within the column of pixel samples comprising the adjacent pixels 201, . . . , 212. For example, amplitude differences may be calculated for each pair of pixels (201-202), (202-204), (204-206), (206-208), (208-210), and (210-212). The amplitude differences may be calculated as differences in chrominance and/or luminance of the sample pixels 201, . . . , 212. In an exemplary aspect of the invention, if an amplitude difference is negative, a difference polarity of −1 may be assigned to the corresponding pixel pair. Similarly, if an amplitude difference is positive, a difference polarity of 1 may be assigned to the corresponding pixel pair. A polarity change count may then be determined for pixels 201, . . . , 212 by calculating the number of subsequent difference polarity changes for the pairs of pixels selected from pixels 201, . . . , 212. Therefore, the PCC result for any given column of 7 sample pixels, such as pixels 201, . . . , 212, may be one of 6 possible values: {0, 1, 2, 3, 4, 5}. In one embodiment of the invention, when counting the number of polarity changes, only consecutive polarity changes, which include the current pixel sample, may be counted.

With regard to luminance amplitude, the general trend of the samples within the column of pixels 201, . . . , 212 is downward or darker, for example, while a distinct pattern of alternating up and down relative values may be present. In one embodiment of the invention, a polarity change count for pixel samples 201, . . . , 212 may be utilized to detect an up and/or down pattern, which may be indicative of weave artifacts. Accordingly, this may be utilized to distinguish weave artifacts from valid details. The presence of weave artifacts, for example, may be indicated by alternating difference polarities for the pixel pairs of the plurality of pixels 201, . . . , 212. As a result, with regard to the 7 selected pixel samples 201, . . . , 212, there may be a total of 6 difference polarities and a maximum of 5 consecutive alternations in the difference polarity values. In the example illustrated in FIG. 2, since there are a total of five consecutive changes in the polarity of differences for pixels 201, . . . , 212, the polarity change count is 5.

A difference polarity measurement may be inherently sensitive to noise such that a high PCC value may result even when the content does not have any component at 1.0 pi. In an exemplary aspect of the invention, the PCC calculation method may incorporate a coring function to eliminate the effects of small noise values on the PCC results. If a given difference value between adjacent lines is less than the coring value, the difference may be ignored and a difference polarity may be regarded as being indeterminate. In such instances, corresponding sample pairs in which the difference polarity is indeterminate may not be utilized in the calculation of the PCC. For example, if there is at least one instance of a difference magnitude for pixel samples 201, . . . , 212 less than a PCC coring value, the PCC may not result in a maximum count of 5. In instances where the PCC is less than a maximum PCC value, it may be determined that weaving adjacent video fields may result in less weave artifacts.

In an exemplary aspect of the invention, when a coring value is utilized for PCC calculation, a set of samples that may be included in the PCC value calculation may comprise consecutive pixels including a current pixel, for example. The differences that exceed the coring value may then be considered for PCC calculation. Referring to FIG. 2, the consecutive and center sample requirements may be met by using a column of 7 consecutive samples. A PCC value of 5 may be a strong indicator of the presence of a 1.0 pi signal exceeding the coring value. The PCC values of 0 or 1 may indicate no significant 1.0 pi signal. A PCC value of 2 may indicate that some 1.0 pi signal may be present. PCC values of 3 or 4 may indicate the presence of a significant 1.0 pi signal.

The coring value may be set to 4, for example, for both luma and chroma, which may be significantly greater than a sigma for random noise with the signal to noise ratio (SNR) values typical of analog video. Even though the present illustration of the invention utilizes a single column of pixel samples, the invention is not so limited. Therefore, PCC calculations may also utilize two adjacent columns of samples, for example. The PCC value may be equal to 5 when both a current column and a column to its immediate left, both have PCC values equal to 5. In this regard, both columns may have the same pattern of difference polarities. Utilizing two adjacent columns of samples, for example, may decrease the sensitivity of the PCC measurement to noise in the input video signal.

Figure 3:
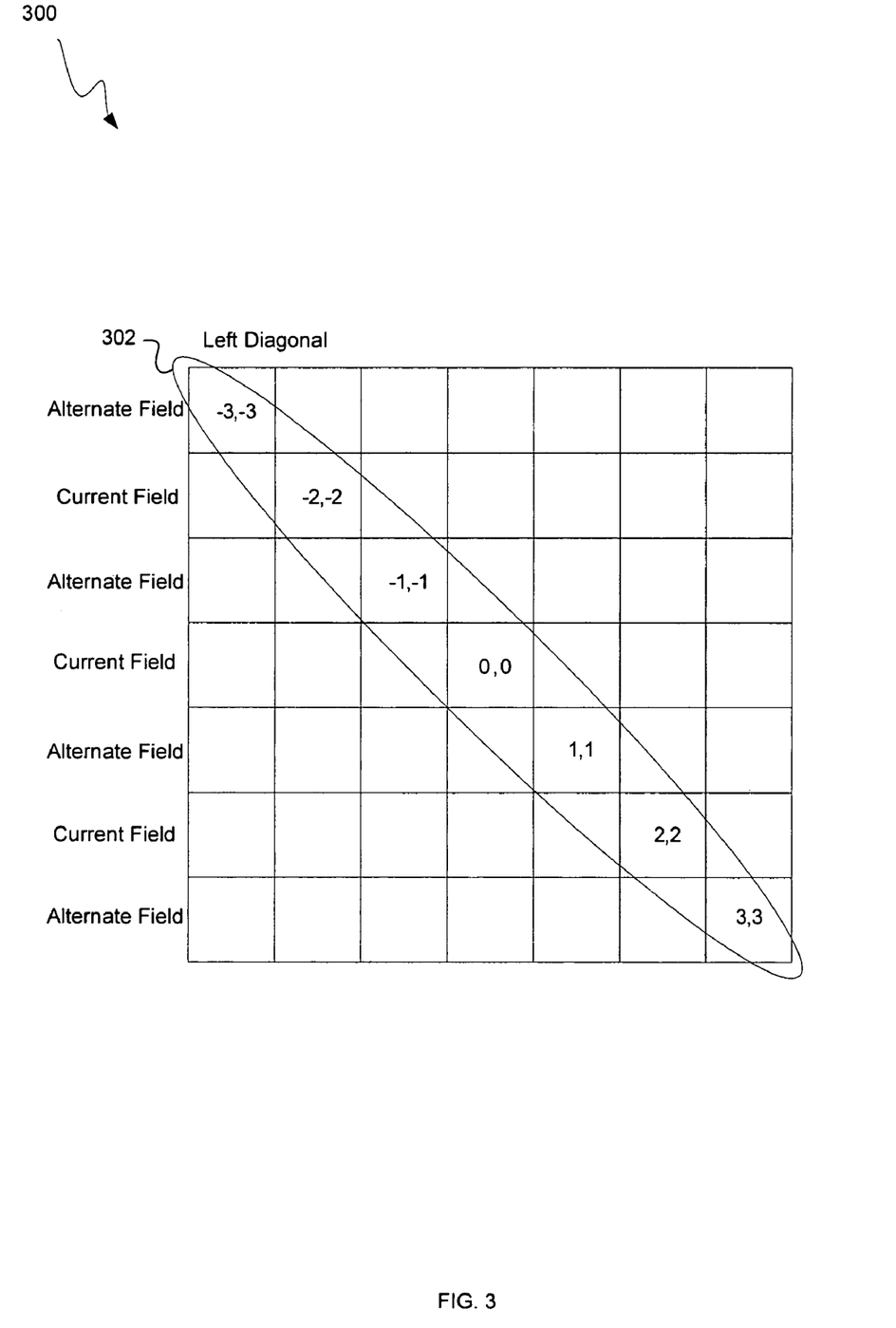
FIG. 3 is a diagram illustrating a plurality of diagonally adjacent samples for polarity change count (PCC) measurement, in accordance with an embodiment of the invention.

FIG. 3 is a diagram 300 illustrating a plurality of diagonally adjacent samples for polarity change count (PCC) measurement, in accordance with an embodiment of the invention. Referring to FIG. 3, there is illustrated a video frame comprising weaved alternate and current video fields. A left diagonal set of pixel samples 302 may be utilized as the column inputs to the PCC algorithm, in order to calculate PCC and detect weave artifacts at diagonal edges. In one aspect of the invention, the left diagonal pixel sample set 302 may be at 45 degrees in relation to a horizontal video line.

The left diagonal pixel sample set 302 may comprise a current pixel (0,0) and diagonally adjacent pixels (−3,−3), (−2,−2), (−1,−1), (1,1), (2,2), and (3,3). Even though a left diagonal pixel sample set 302 comprising 7 samples is illustrated in FIG. 3, the present invention may not be so limited. Accordingly, other left diagonal pixel sample sets with a different number of pixel samples may also be utilized for calculation of a PCC. Further, a left diagonal pixel sample set may be at an angle other than 45 degrees in relation to a horizontal axis.

Figure 4:
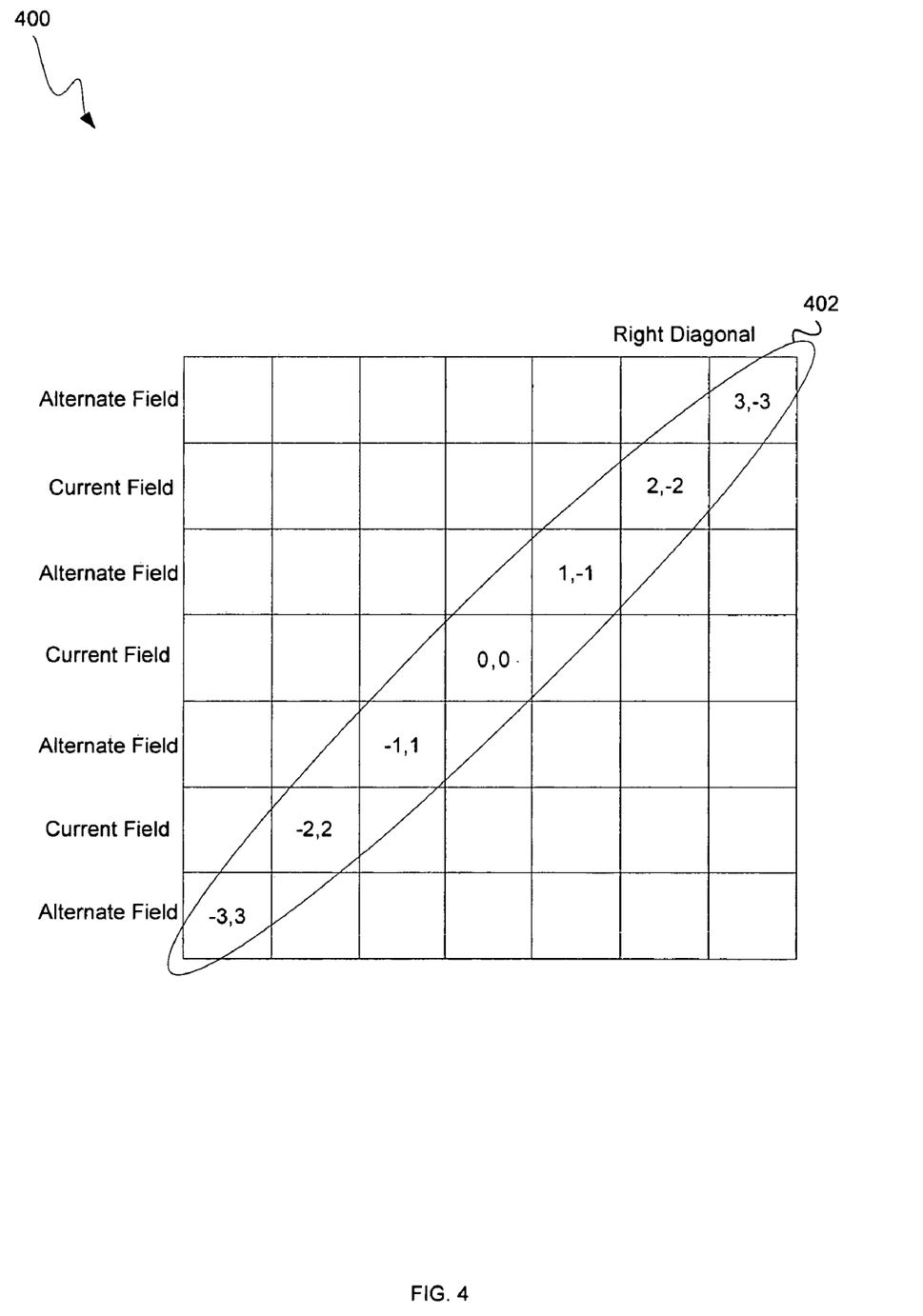
FIG. 4 is a diagram illustrating a plurality of diagonally adjacent samples for polarity change count (PCC) measurement, in accordance with an embodiment of the invention.

FIG. 4 is a diagram 400 illustrating a plurality of diagonally adjacent samples for polarity change count (PCC) measurement, in accordance with an embodiment of the invention. Referring to FIG. 4, there is illustrated a video frame comprising weaved alternate and current video fields. A right diagonal set of pixel samples 402 may be utilized as the column inputs to the PCC algorithm, in order to calculate PCC and detect weave artifacts at diagonal edges. In one aspect of the invention, the right diagonal pixel sample set 402 may be at 45 degrees in relation to a horizontal video line.

The right diagonal pixel sample set 402 may comprise a current pixel (0, 0) and diagonally adjacent pixels (3,−3), (2,−2), (1,−1), (−1,1), (−2,2), and (−3, 3). Even though a right diagonal pixel sample set 402 comprising 7 samples is illustrated in FIG. 4, the present invention may not be so limited. Accordingly, other right diagonal pixel sample sets with a different number of pixel samples may also be utilized for calculation of a PCC. Furthermore, a right diagonal pixel sample set may be at an angle other than 45 degrees in relation to a horizontal axis.

Figure 5:
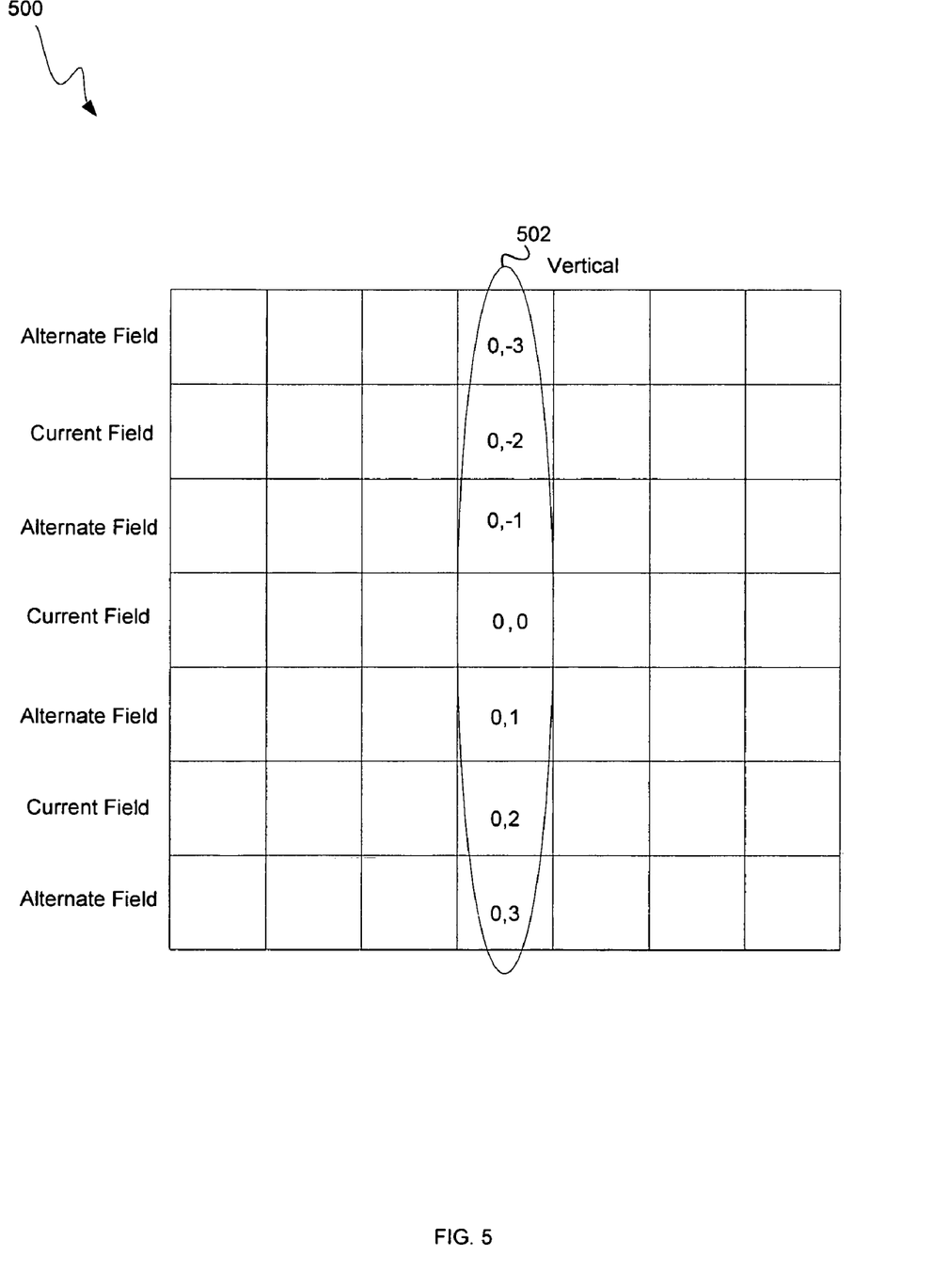
FIG. 5 is a diagram illustrating a plurality of vertically adjacent samples for polarity change count (PCC) measurement, in accordance with an embodiment of the invention.

FIG. 5 is a diagram 500 illustrating a plurality of vertically adjacent samples for polarity change count (PCC) measurement, in accordance with an embodiment of the invention. Referring to FIG. 5, there is illustrated a video frame comprising weaved alternate and current video fields. A vertical set of pixel samples 502 may be utilized as the column inputs to the PCC algorithm, in order to calculate PCC and detect weave artifacts at diagonal edges. The vertical pixel sample set 502 may comprise a current pixel (0, 0) and vertically adjacent pixels (0,−3), (0,−2), (0,−1), (0,1), (0,2), and (0, 3). Even though a vertical pixel sample set 502 comprising 7 samples is illustrated in FIG. 5, the present invention may not be so limited. Accordingly, other vertical pixel sample sets with a different number of pixel samples may also be utilized for calculation of a PCC.

In one embodiment of the invention, the choice of which set of samples to use to create a PCC value utilized for associated functions, such as de-interlacing, may be based, for example, on determining which of a plurality of sets of vertically adjacent samples produce the largest PCC value. The sample sets may be selected along a line or lines of a determined angle, or angles. Alternatively, in another embodiment of the invention, this choice may be based on the finding of an edge in the video content and determining which angle of sample sets best matches the angle of the edge so found.

Figure 6:
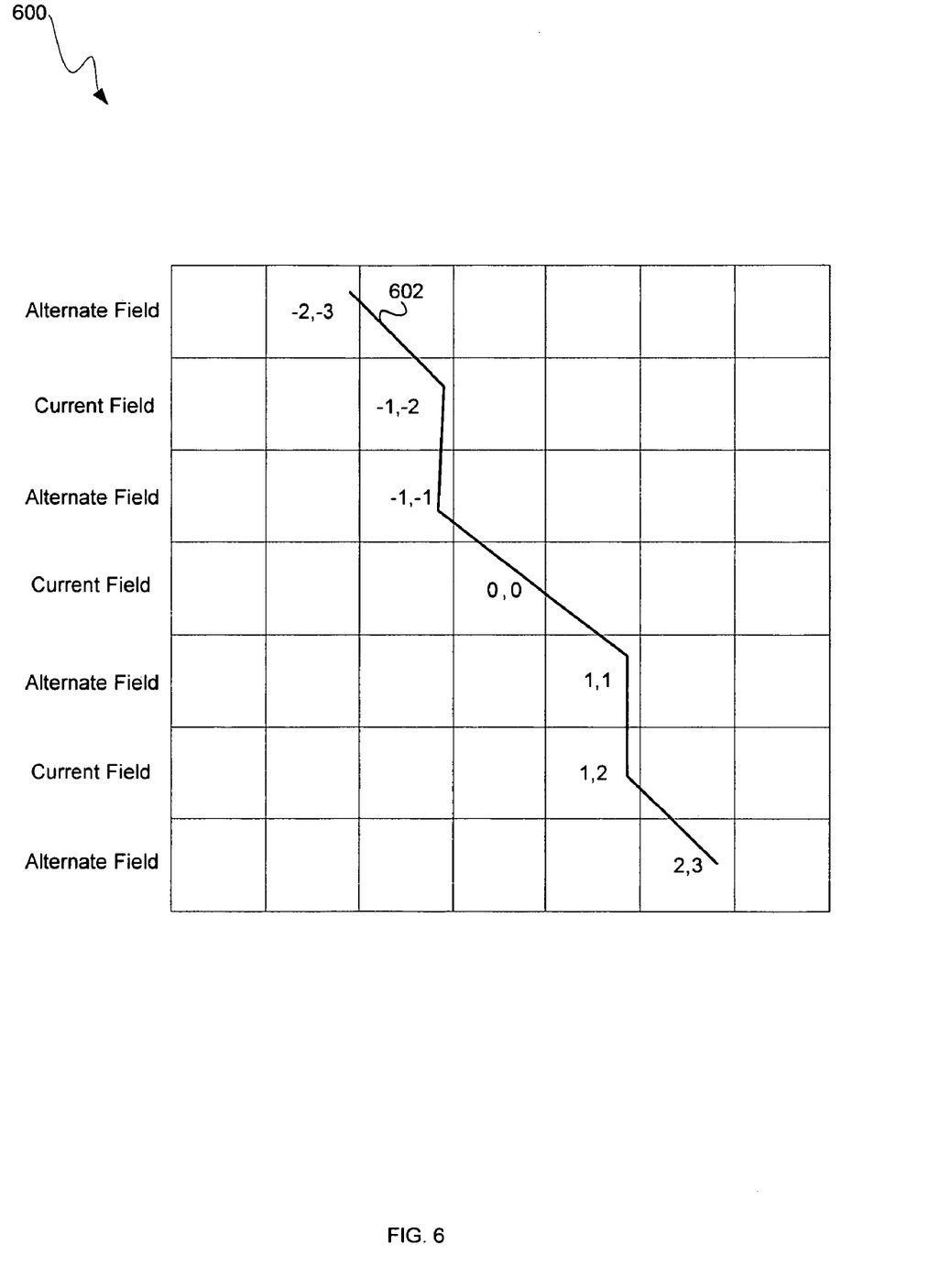
FIG. 6 is a diagram illustrating a plurality of diagonally and vertically adjacent samples for polarity change count (PCC) measurement, in accordance with an embodiment of the invention.

FIG. 6 is a diagram illustrating a plurality of diagonally and vertically adjacent samples for polarity change count (PCC) measurement, in accordance with an embodiment of the invention. Referring to FIG. 6, there is illustrated a video frame comprising weaved alternate and current video fields. A vertical and diagonal set of pixel samples 602 may be utilized as the column inputs to the PCC algorithm, in order to calculate PCC and detect weave artifacts at diagonal edges.

The vertical and diagonal pixel sample set 602 may comprise a current pixel (0, 0) and adjacent pixels (−2,−3), (−1,−2), (−1,−1), (1,1), (1,2), and (2,3). Even though a vertical and diagonal pixel sample set 602 comprising 7 samples is illustrated in FIG. 6, the present invention may not be so limited. Accordingly, other vertical and diagonal pixel sample sets with a different number of pixel samples may also be utilized for calculation of a PCC. Furthermore, a diagonal portion of the pixel sample set may be at a 45 degree angle or at an angle other than 45 degrees in relation to a horizontal axis.

Figure 7:
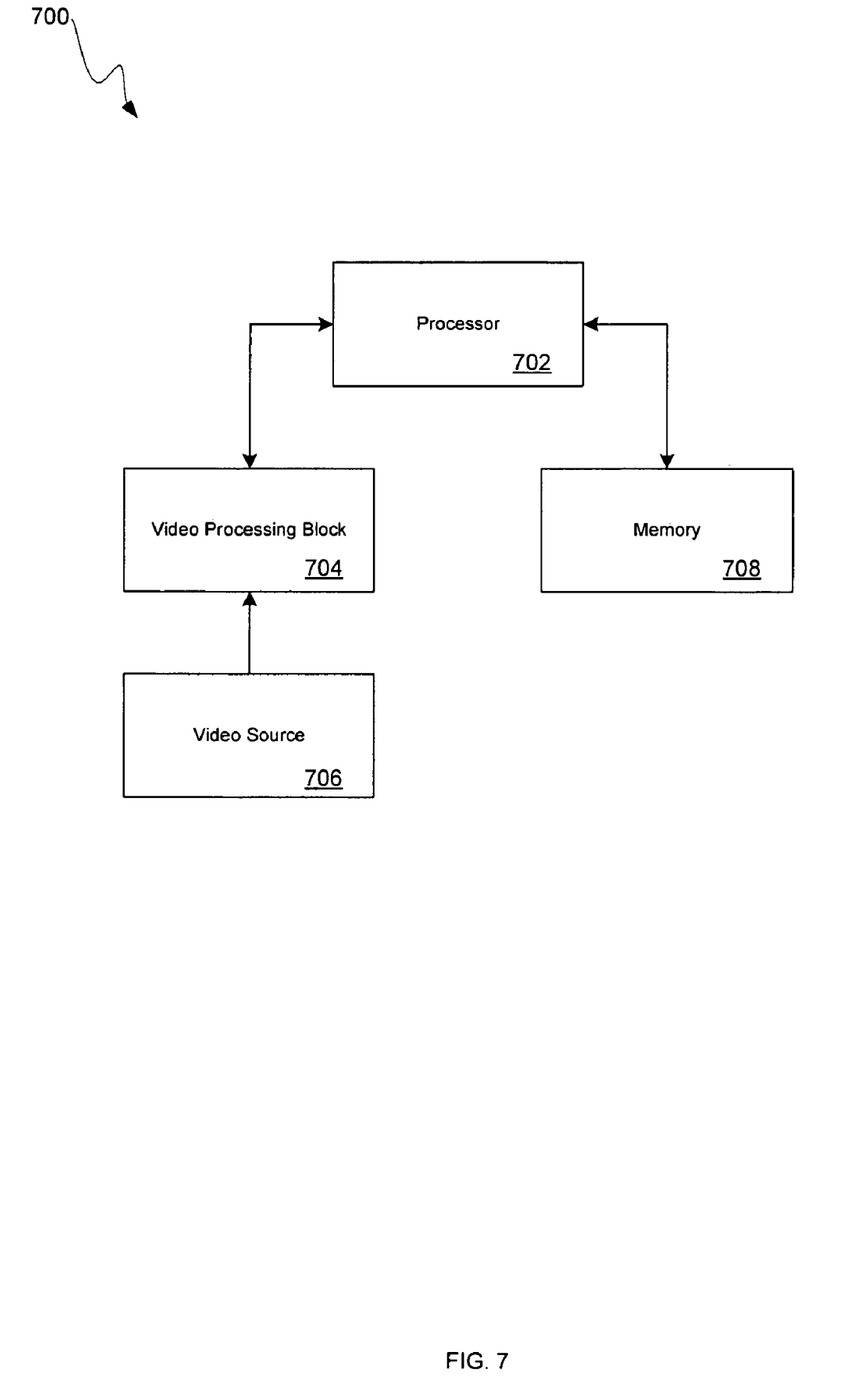
FIG. 7 is a block diagram of an exemplary system for comparing pixels, in accordance with an embodiment of the invention.

FIG. 7 is a block diagram of an exemplary system for comparing pixels, in accordance with an embodiment of the invention. Referring to FIG. 7, the exemplary system 700 may comprise a processor 702, a video processing block 704, memory 708, and a video source 706. The video source 706 may comprise suitable circuitry, logic, and/or code and may be adapted to communicate raw video stream data to the video processing block 704. The video processing block 704 may comprise suitable circuitry, logic, and/or code and may be adapted to process the raw video data received from the video source 706. For example, the video processing block 704 may be adapted to deinterlace interlaced video data received from the video source 706. In this regard, the video processing block 704 may be implemented as a specialized video processing chip, or as a specialized video processing function within a chip comprising other functions.

The processor 702 may comprise suitable circuitry, logic, and/or code and may be adapted to control processing of video information by the video processing block 704, for example. The processor 702 may comprise a system or a host processor. The memory 708 may be adapted to store raw or processed video data, such as video data processed by the video processing block 704. Furthermore, the memory 708 may be utilized to store code that may be executed by the processor 702 in connection with video processing tasks performed by the video processing block 704. For example, the memory 708 may store code that may be utilized by the processor 702 and the video processing block 704 for calculating a polarity change count and utilizing the calculated polarity change count during deinterlacing of interlaced video received from the video source 706.

Figure 8:
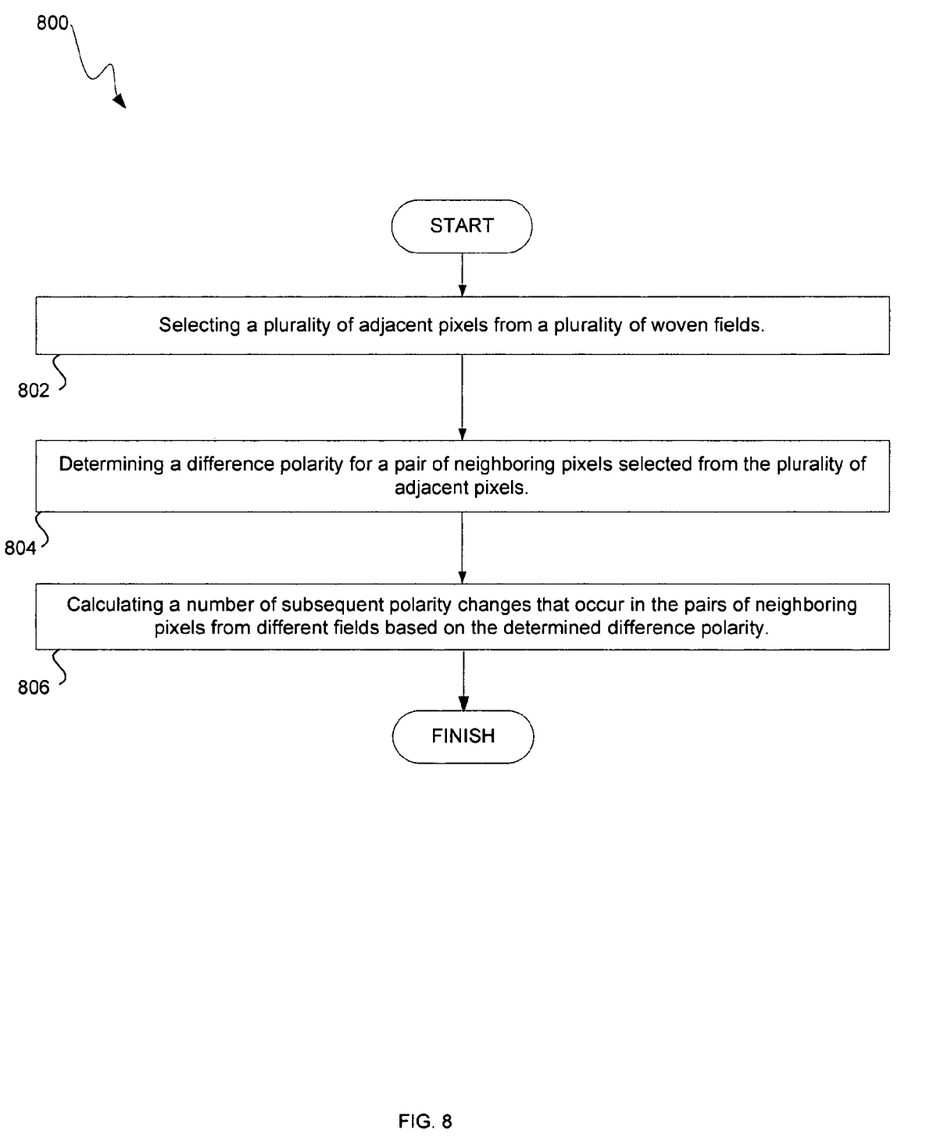
FIG. 8 is a flow diagram of exemplary steps for comparing pixels, in accordance with an embodiment of the invention.

FIG. 8 is a flow diagram 800 of exemplary steps for comparing pixels, in accordance with an embodiment of the invention. Referring to FIG. 8, at 802, a plurality of adjacent pixels may be selected from a plurality of woven fields, such as a top and a bottom video field. At 804, a difference polarity may be determined for each pair of neighboring pixels from different fields selected from the plurality of adjacent pixels. At 806, a polarity change count may be determined by calculating the number of subsequent polarity changes that occur in the pairs of neighboring pixels from different fields, based on the determined difference polarity for each pair of neighboring pixels.

In an exemplary aspect of the invention, a polarity change count (PCC) may be utilized to detect bad weave artifacts in adjacent interlaced video fields woven together. In this regard, bad weave detection may be utilized to measure or estimate the degree of bad weave artifacts that would be produced at each output sample if a given weave combination were to be used for that sample. After bad weaves are detected and measured utilizing PCC, it may be determined whether weaving, spatial interpolation or a combination of these, for example, may be utilized during deinterlacing to minimize bad weave artifacts and maximize image clarity in the final output sample.

In another aspect of the invention, PCC may be utilized to determine whether a progressive scheme or an interlaced scheme may be utilized for encoding of adjacent top and bottom fields. U.S. patent application Ser. No. 11/254,455 filed Oct. 20, 2005 discloses a method and system for inverse telecine and field pairing utilizing PCC to determine whether a progressive scheme or an interlaced scheme may be utilized for encoding of adjacent top and bottom fields. U.S. patent application Ser. No. 11/254,455 is hereby incorporated herein by reference in its entirety.

Even though the present invention describes polarity change count calculation for a sample of seven adjacent pixels, the present invention may not be so limited. In this regard, a smaller or larger sample of pixels may be selected for calculating a polarity change count. In addition, polarity change count may be calculated utilizing chroma and/or luma values of the selected pixel samples.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system may be determined primarily by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for comparing pixels, the method comprising:
performing by one or more processors and/or circuits within a single chip:
determining at least one difference polarity for at least one pair of neighboring pixels selected from a plurality of adjacent pixels from different fields; and
calculating a number of polarity changes for said at least one pair of neighboring pixels based on said determined at least one difference polarity.

2. The method according to claim 1, wherein said at least one difference polarity is determined based on a coring function.

3. The method according to claim 1, comprising calculating at least one number of polarity changes for said plurality of adjacent pixels from different fields, wherein said plurality of adjacent pixels comprise pixels in adjacent columns, and wherein said plurality of adjacent pixels are located along a line of a determined angle.

4. The method according to claim 3, comprising calculating a final number of polarity changes for said plurality of adjacent pixels from different fields, based on at least a highest one of said calculated at least one number of polarity changes for said plurality of adjacent pixels from different fields.

5. The method according to claim 1, comprising selecting said plurality of adjacent pixels from a plurality of woven fields, wherein at least a portion of said selected plurality of adjacent pixels comprises one or more of vertically adjacent pixels, horizontally adjacent pixels and/or diagonally adjacent pixels in neighboring fields.

6. The method according to claim 1, wherein at least one pixel in said plurality of adjacent pixels comprises one or both of a vertically adjacent pixel that is located in a different field and/or a diagonally adjacent pixel that is located in a different field.

7. The method according to claim 1, comprising:
selecting a current pixel from said plurality of adjacent pixels; and
determining said at least one difference polarity for said at least one pair of neighboring pixels, wherein said neighboring pixels comprise said selected current pixel.

8. The method according to claim 1, comprising subtracting a first amplitude value for a first pixel in said at least one pair of neighboring pixels from a second amplitude value for a second pixel in said at least one pair of neighboring pixels to determine said at least one difference polarity.

9. The method according to claim 8, wherein each of said first amplitude value and said second amplitude value comprises one or both of a pixel luminance amplitude and/or a pixel chrominance amplitude.

10. The method according to claim 1, comprising counting said polarity changes for said at least one pair of neighboring pixels, wherein said at least one pair of neighboring pixels comprises a current pixel.

11. The method according to claim 1, comprising determining whether to encode said plurality of adjacent pixels from different fields utilizing a progressive scheme or an interlaced scheme, based on said calculating.

12. A machine-readable storage having stored thereon, a computer program having at least one code section for comparing pixels, the at least one code section being executable by a machine for causing the machine to perform steps comprising:
determining at least one difference polarity for at least one pair of neighboring pixels selected from a plurality of adjacent pixels from different fields; and
calculating a number of polarity changes for said at least one pair of neighboring pixels based on said determined at least one difference polarity.

13. The machine-readable storage according to claim 12, wherein said at least one difference polarity is determined based on a coring function.

14. The machine-readable storage according to claim 12, comprising code for calculating at least one number of polarity changes for said plurality of adjacent pixels from different fields, wherein said plurality of adjacent pixels comprise pixels in adjacent columns, and wherein said plurality of adjacent pixels are located along a line of a determined angle.

15. The machine-readable storage according to claim 14, comprising code for calculating a final number of polarity changes for said plurality of adjacent pixels from different fields, based on at least a highest one of said calculated at least one number of polarity changes for said plurality of adjacent pixels from different fields.

16. The machine-readable storage according to claim 12, comprising code for selecting said plurality of adjacent pixels from a plurality of woven fields, wherein at least a portion of said selected plurality of adjacent pixels comprises one or more of vertically adjacent pixels, horizontally adjacent pixels and/or diagonally adjacent pixels in neighboring fields.

17. The machine-readable storage according to claim 12, wherein at least one pixel in said plurality of adjacent pixels comprises one or both of a vertically adjacent pixel that is located in a different field and/or a diagonally adjacent pixel that is located in a different field.

18. The machine-readable storage according to claim 12, comprising:
code for selecting a current pixel from said plurality of adjacent pixels; and code for determining said at least one difference polarity for said at least one pair of neighboring pixels, wherein said neighboring pixels comprise said selected current pixel.

19. The machine-readable storage according to claim 12, comprising code for subtracting a first amplitude value for a first pixel in said at least one pair of neighboring pixels from a second amplitude value for a second pixel in said at least one pair of neighboring pixels to determine said at least one difference polarity.

20. The machine-readable storage according to claim 19, wherein each of said first amplitude value and said second amplitude value comprises one or both of a pixel luminance amplitude and/or a pixel chrominance amplitude.

21. The machine-readable storage according to claim 12, comprising code for counting said polarity changes for said at least one pair of neighboring pixels, wherein said at least one pair of neighboring pixels comprises a current pixel.

22. The machine-readable storage according to claim 12, comprising code for determining whether to encode said plurality of adjacent pixels from different fields utilizing a progressive scheme or an interlaced scheme, based on said calculating.

23. A system for comparing pixels, the system comprising:
at least one processor that is operable to determine at least one difference polarity for at least one pair of neighboring pixels selected from a plurality of adjacent pixels from different fields; and
said at least one processor is operable to calculate a number of polarity changes for said at least one pair of neighboring pixels based on said determined at least one difference polarity.

24. The system according to claim 23, wherein said at least one processor is operable to select said plurality of adjacent pixels from a plurality of woven fields, wherein at least a portion of said selected plurality of adjacent pixels comprise pixels in neighboring fields.

25. The system according to claim 24, wherein at least a portion of said selected plurality of adjacent pixels comprises one or more of vertically adjacent pixels, horizontally adjacent pixels and/or diagonally adjacent pixels.

26. The system according to claim 23, wherein at least one pixel in said plurality of adjacent pixels comprises one or more of a horizontally located adjacent pixel, a vertically located adjacent pixel and/or a diagonally located adjacent pixel, which is located in a different field.

27. The system according to claim 23, wherein said at least one processor is operable to subtract a first amplitude value for a first pixel in said at least one pair of neighboring pixels from a second amplitude value for a second pixel in said at least one pair of neighboring pixels to determine said at least one difference polarity.

28. The system according to claim 27, wherein each of said first amplitude value and said second amplitude value comprises one or both of a pixel luminance amplitude and/or a pixel chrominance amplitude.

29. The system according to claim 23, wherein said at least one processor is operable to count said polarity changes for said at least one pair of neighboring pixels, wherein said at least one pair of neighboring pixels comprises a current pixel.

30. The system according to claim 23, wherein said at least one processor is operable to determine whether to encode said plurality of adjacent pixels from different fields utilizing a progressive scheme or an interlaced scheme, based on said calculating.

* * * * *